July 6, 1926.
J. W. BETTENDORF
BRAKE HANGER
Filed Nov. 6, 1925
1,591,505
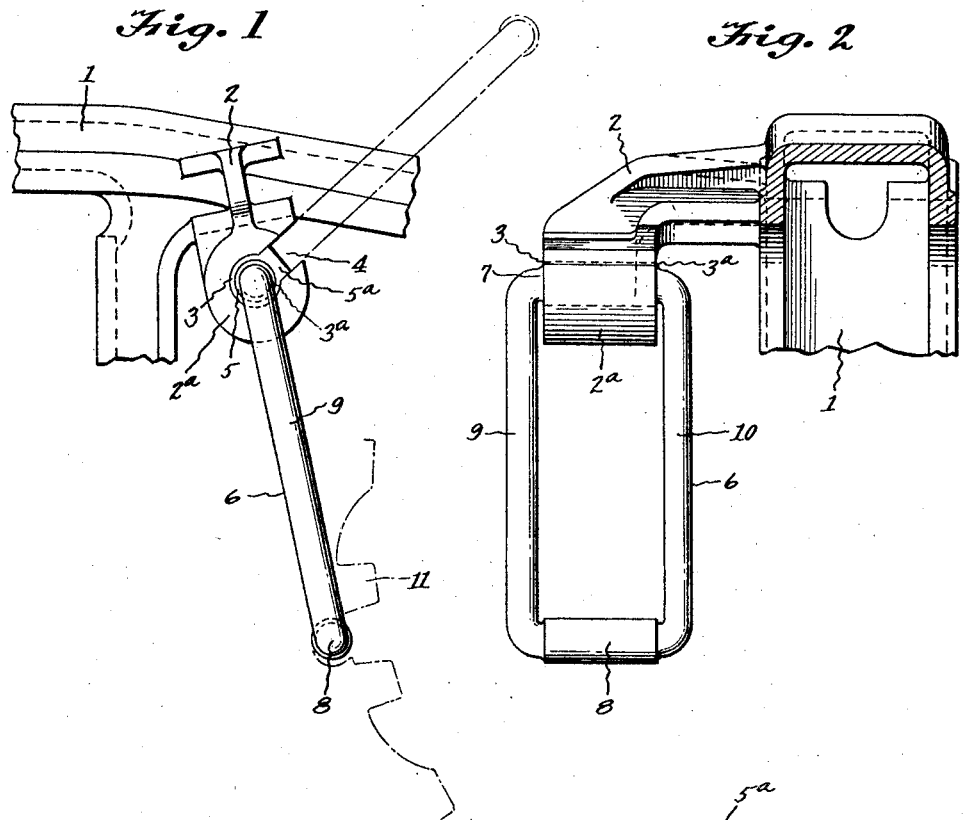
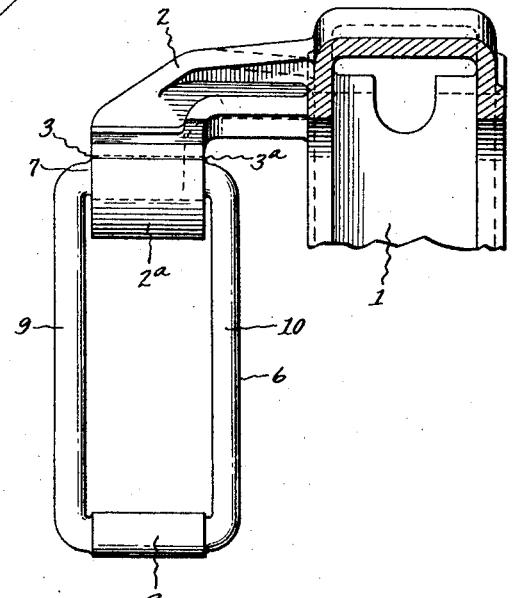
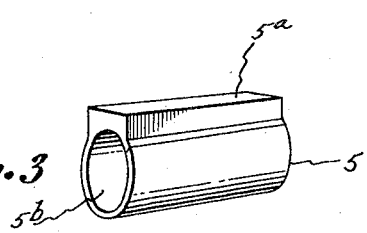
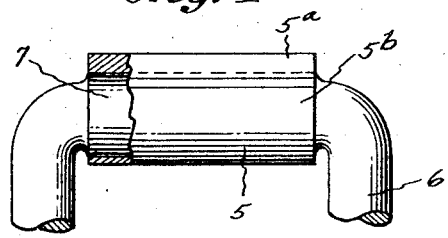
INVENTOR
J. W. Bettendorf
BY Lloyd L. Evans
ATTORNEY Patented July 6, 1926.

1,591,505

UNITED STATES PATENT OFFICE.

JOSEPH W. BETTENDORF, OF BETTENDORF, IOWA.

BRAKE HANGER.

Application filed November 6, 1925. Serial No. 67,261.

This invention relates to railway brake hanger mechanisms and more particularly to a brake hanger and a bearing portion for supporting said brake hanger.

In railway brake constructions it is desirable and important that the connections of the brake hanger to its supporting means be secured and that said hanger be supported in such manner that both hanger and supporting means may withstand long usage. The hanger and support connections must be secure to prevent the brake construction from dropping and thereby causing possible derailment and consequent wreckage. Economically, it is desirable, particularly where the supporting bracket is integral with the frame, that the said bracket last the life of the railway truck or car.

An object of this invention is to provide a brake hanger and supporting bracket connection adapted to provide long life of the bracket.

Another object of my invention is to provide a long bearing surface between a brake hanger and the bearing portion in which it is supported, over which surface the pressure and wear may be substantially uniformly distributed.

A further object of this invention is to provide a bushing between a brake hanger and the bearing portion of the support, which bushing will be rotatively locked with respect to the said bearing portion to thus prevent wear thereof.

Another object of the invention is to provide a bushing between a brake hanger and the bearing portion of a support to prevent wear of said support whatever be the direction of the thrust of said brake hanger during the normal operation thereof.

These and other objects of my invention will be apparent from the following description and annexed drawings in which:

Figure 1 is a fragmentary side elevation showing a portion of a truck side frame, a supporting bracket integrally formed therewith, a brake hanger supported in the bearing portion of said bracket, and a bushing according to my invention disposed between said brake hanger and bearing portion;

Fig. 2 is a fragmentary front elevation, partially in section, of the cooperating parts shown in Fig. 1;

Fig. 3 is a perspective view of a bushing according to my invention; and

Fig. 4 is a fragmentary elevation partially in section showing an end and adjacent sides of a brake hanger, a bushing according to my invention surrounding the end thereof.

In the drawings is shown at 1 a side portion of a railroad car truck frame to which is attached a brake hanger supporting means, comprising a bracket 2 at the outer end of which is provided a bearing portion 2ª with a bearing aperture 3 and bearing walls 3ª extending longitudinally thereof. The said bracket 2 is preferably formed integral with truck frame portion 1. The bearing aperture 3 is preferably cylindrical in shape and communicates with the exterior of said bearing portion by means of slot 4 extending longitudinally of the bearing aperture 3 and outwardly thereof. Within the bearing aperture 3 is shown a bushing 5 which will be more fully described hereinafter. Within the bushing 5 is shown the upper end of a brake hanger 6, which hanger may preferably be of the closed rectangular loop type having upper and lower ends 7 and 8 and sides 9 and 10, and which may be formed of any suitable material such as rolled or cast steel. The lower end 8 is adapted to cooperate with the brake head 11 suggested in the dotted lines in Fig. 1, which brake head 11 is in turn adapted to cooperate with a brake shoe (not shown) as will be readily understood by those skilled in the art.

During the operation of the brakes, the brake hanger 6 is given a swinging motion about the brake hanger end 7 as a pivot. In the absence of bushings, such motion would in time cause considerable wear between the brake hanger end 7 and bearing portion 2ª of the bracket 2. It may be noted that, particularly where the bracket 2 and bearing portion 2ª are formed integral with the frame 1, it is desired that the said bracket and bearing portion remain in serviceable condition as long as the frame 1. My invention contemplates substantial reduction or elimination of the wear on the bearing portion 2ª so that said bearing portion may not be substantially deteriorated in service.

I propose to substantially reduce or eliminate the wear on the bearing portion 2ª by disposing a bushing 5 between the brake hanger end 7 and the walls 3ª of the aperture 3, said bushing 5 being locked against rotation with respect to the bearing portion 2ª, as by a projection 5ª extending into the slot 4. In such case, relative movement takes place between the brake hanger end 7 and the bushing 5, thus protecting the bearing portion 2ª from any wearing action.

To those skilled in the art, it will be readily apparent that during the operation of the brakes the thrust of the brake hanger 6 upon the bearing portion 2ª may be upward or downward, depending upon the direction of rotation of the car wheels. With the bushing 5 as shown, relative movement of the brake hanger end 7 takes place with the bushing 5 whatever the direction of thrust of the brake hanger 6, thereby eliminating any wear of the bearing portion 2ª.

The bushing 5 is preferably composed in part of a metal portion 5ᵇ which may be disposed about the brake hanger end 7 by any suitable method, as by a pressing operation, forming thereby substantially a split sleeve. The bushing 5 is provided with a projecting portion 5ª extending longitudinally of the bushing. The projection 5ª preferably has a width substantially equal to that of the slot 4 so that said projection 5ª may fit therein without any substantial side play, whereby the bushing 5 is locked against rotation with respect to the aperture walls 3ª.

The projecting portion 5ª may be of any desired contour but is preferably of suitable shape to contact with the sides of the slot 4, to prevent rotational movement of the bushing 5. Further, said projection 5ª may comprise a separate member or members suitably attached to the sheet metal portion 5ᵇ, or may be integral therewith to form a thickened portion as shown in the drawings. The bushing 5 may also be formed, of course, from a continuous tubular portion, and in any manner to give said bushing the desired shape and contour.

During the operation of the mechanism, the hanger 6 has a relatively small pivotal movement about the hanger end 7. The slot 4 in the bearing portion 2ª is shown as extending upwardly and outwardly of the aperture 3 at such an angle that a solid bearing surface is presented to the brake hanger end 7, whether the thrust of said brake hanger be upward or downward.

The hanger 6 and bushing 5 may be removed from the bearing portion 2ª by suitably disconnecting the lower portion of said hanger from the brake head 11, swinging said lower end 8 to the position shown in the dotted lines in Fig. 8 with the sides 9 and 10 in alignment with the walls of the slot 4, and moving the hanger 6 longitudinally of the aperture 3 and away from the frame portion 1. The reverse procedure may be employed to dispose said brake hanger end 7 within the aperture 3.

It will be noted that where the width of the slot 4 is equal to or greater than the diameter of the end portion 7, a bushing according to my invention also prevents the lateral displacement of said brake hanger end portion through the said slot.

It will be seen that a bushing such as described herein may be readily disposed in operative position to provide a simple and economical means for eliminating wear of the brake hanger supporting bearing portion.

It is obvious of course that such bearing portion and bushing may be employed to cooperate with either end of a brake hanger.

It is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In brake mechanism, the combination with a brake hanger supporting bracket having a bearing portion provided with a slotted bearing aperture, of a brake hanger having an end portion adapted to be received in said bearing aperture, and a bushing disposed between the said end portion and bearing portion, said bushing having a portion extending outwardly into said slot to lock said bushing against rotative movement with respect to said bearing portion.

2. In brake mechanism, a bearing portion for cooperating with a brake hanger, an aperture in said bearing portion, a slot extending outwardly of said bearing portion from said aperture, a brake hanger end disposed within said aperture, a bushing disposed between said brake hanger end and the bearing surface of the bearing portion and substantially surrounding said brake hanger end, said bushing extending outwardly into said slot to contact with the sides thereof, to thereby lock said bushing against rotative movement with respect to said bearing portion.

3. In brake mechanism, a brake hanger support having a bearing portion, an aperture in said bearing portion, a substantially rectangular slot extending longitudinally of said bearing aperture and outwardly of said bearing portion from said aperture, a brake hanger end disposed within said aperture and substantially surrounded by a metal bushing, said bushing having an enlarged portion extending into said slot and substantially contacting with the sides thereof to lock said bushing against rotation with respect to said bearing portion whereby relative wear is caused to take place between said hanger end and said bushing.

4. In brake mechanism, means adapted to cooperate with a bearing portion provided with a slotted aperture comprising a brake hanger provided with an end portion, a bushing substantially surrounding said end portion, said bushing being provided with a longitudinally and outwardly extending portion adapted to extend into said slot to lock said bushing from rotational movement with respect to said bearing portion.

5. In brake mechanism, means adapted to cooperate with a bearing portion provided with a slotted aperture comprising a closed substantially rectangular loop brake hanger having ends and sides, a split sleeve metal bushing disposed about an end of said hanger, said bushing having a longitudinally and outwardly extending thickened portion adapted to extend into said slot to lock said bushing from rotational movement with respect to said bearing portion.

6. In brake mechanism, a bushing adapted to be disposed about an end of a brake hanger and to be locked against rotation with respect to a bearing portion provided with a slotted aperture, said bushing comprising material adapted to substantially surround said end portion, said material having means adapted to extend longitudinally and outwardly of said bushing to engage said slot and thereby lock said bushing against rotation with respect to said bearing portion.

7. In brake mechanism, a bushing adapted to be disposed about an end of a brake hanger and to be locked against rotation with respect to a bearing portion provided with a slotted aperture, said bushing comprising sheet metal adapted to substantially surround said end portion, said sheet metal having a thickened portion adapted to extend longitudinally of said bushing and to engage the sides of said slot and thereby lock said bushing against rotation with respect to said bearing portion.

In testimony whereof I affix my signature.

JOSEPH W. BETTENDORF.